Patented Sept. 5, 1950

2,521,399

UNITED STATES PATENT OFFICE 2,521,399

PROCESS FOR THE PREPARATION OF TERPINEOL

Sereno G. Norton, Brunswick, Ga., assignor to Hercules Powder Company, Wilmington, Del., a corporation of Delaware No Drawing. Application July 10, 1947, Serial No. 760,119

4 Claims. (Cl. 260—631.5)

This invention relates to the process of partially dehydrating terpin hydrate to form terpineol.

It is well known that terpin hydrate may be dehydrated to terpineol by treatment with phosphoric acid, sulfuric acid, etc. In carrying out this process a secondary dehydration reaction occurs and, as a result, the product obtained is a mixture of terpineol and monocyclic terpene hydrocarbons. The latter compounds are of limited utility and various attempts have been made to increase the yield of terpineol, which is a commercially valuable material. Most of these methods require either elaborate processing operations or the utilization of additional costly materials.

Now in accordance with this invention, it has been discovered that terpin hydrate may be dehydrated to terpineol, without any appreciable amount of the secondary dehydration occurring, by heating the terpin hydrate with water acidified to a pH of 3.4 to 6.9 with dissolved carbon dioxide, at a temperature of about 117° to 200° C. and under a pressure of about 40 to 200 pounds per square inch. Not only is this process a simple and efficient method for dehydrating terpin hydrate to terpineol in high yields without producing any appreciable amount of terpene hydrocarbon, but it makes possible the recovery, in the form of the valuable terpineol, of terpin hydrate from water solutions containing small percentages of terpin hydrate. In many operations in the naval stores industry the waste water contains a small percentage of terpin hydrate, which, because of its low concentration, is not recoverable and is, therefore, lost. It has now been found that when this waste water, containing dissolved carbon dioxide, is heated under the above described conditions, the terpin hydrate in it is converted to terpineol which may be recovered, resulting in great economies to the industry. Another important advantage of this process is that the terpin hydrate which is dissolved or suspended in crude synthetic pine oil such as that derived from turpentine by hydrating in acid mixture, in which the terpin hydrate is present to the extent of 2-3%, may be converted to terpineol by this process without causing the further dehydration of the pine oil to terpene hydrocarbon.

The following examples are demonstrative of the process in accordance with this invention. All parts and percentages are by weight unless otherwise indicated.

Example I

Fifty parts of a purified terpin hydrate were dissolved in 2500 parts of distilled water which had previously been brought to a pH of 3.4 by bubbling carbon dioxide through it. The solution was heated at 50 pounds gauge pressure to 153° C. for 3 hours. The vapors were then released through a valve and condensed, the terpineol formed being thus steam distilled from the reaction mixture. The terpineol oil layer was separated and dried and was found to have a refractive index at 20° C. of 1.4808 indicating that little dehydration to the hydrocarbon had occurred (the refractive index of typical pure mixed terpineols is 1.4810).

Example II

Fifty parts of purified terpin hydrate and 2500 parts of distilled water, adjusted to a pH of 6.9 by boiling to remove part of the dissolved carbon dioxide, were heated at 50 pounds gauge pressure to 153° C. for 10 minutes. The vapors were then released through a valve and condensed. The terpineol oil layer had a refractive index at 20° C. of 1.4821, indicating that substantially no terpene hydrocarbons had been formed. However, terpin hydrate was recovered from the autoclave water, the heating period having been too short at this temperature for complete conversion.

Example III

Fifty parts of purified terpin hydrate were heated in an autoclave with 2500 parts of freshly distilled water, having a pH of 6.0 due to the dissolved carbon dioxide, for 1 hour at 100 pounds gauge pressure and a temperature of 168° C. The vapors were then released through a valve and condensed. The terpineol oil layer which was recovered and dried amounted to 31.3 parts and had a refractive index at 20° C. of 1.4771.

Example IV

Fifty parts of terpin hydrate and 2500 parts of distilled water, which had been brought to a pH of 3.6 by bubbling carbon dioxide through it, were heated in an autoclave for 1 hour at 90-95 pounds gauge pressure and a temperature of 165° C. The pressure was then released and the oil formed was steam distilled off with 1000 parts of water. A yield of 28 parts of terpineol having a refractive index at 20° C. of 1.4791 was obtained.

Example V

Example IV was repeated except that the distilled water was brought to a pH of 6.0 by bubbling carbon dioxide through it and the reaction was carried out at a temperature of 168° C. A yield of 31 parts of terpineol having a refractive index at 20° C. of 1.4771 was obtained.

Example VI

Two hundred parts of terpin hydrate and 2000 parts of a distilled water, adjusted to a pH of 5.2 by means of carbon dioxide, were charged to an autoclave and heated to 155°–156° C. for 30 minutes at 60–65 pounds gauge pressure. The charge was then allowed to distill through a valve and 112 parts of oil representing a yield of 70% of the theoretical yield was obtained. This oil had a refractive index at 20° C. of 1.4783, a specific gravity at 15.5° C. of 0.9374, and was found to contain 100% tertiary alcohols.

Example VII

A mixture of 5675 parts of technical grade terpin hydrate in 56,750 parts of plant waste water (a plant steam condensate having a pH of 5.8 due to dissolved carbon dioxide) was placed in an autoclave and the pressure was raised to 150 pounds gauge pressure and to a temperature of 183° C. over a 15-minute period. At this point, the vapors were flashed off through a pressure valve and condensed, whereby the pressure in the autoclave was reduced to 110 pounds. Steam distillation was continued at that pressure until no more oil was obtained. The terpineol produced amounted to 2382 parts (63.7% of the theoretical yield). It had a refractive index at 20° C. of 1.4818, a specific gravity at 15.5° C. of 0.9360, and contained 99.3% tertiary alcohols, indicating that the terpineol was practically free from any monocyclic terpene hydrocarbons. Some unconverted terpin hydrate remained in the autoclave indicating that the terpin hydrate which was in solution in the water was entirely converted.

Example VIII

A plant waste water was found to contain 0.4% terpin hydrate and had a pH of 5.0 due to dissolved carbon dioxide. This waste water, 56,750 parts, was heated to 181° C. under 150 pounds gauge pressure. As soon as this temperature and pressure had been reached, the vapors were released through a pressure valve and condensed. Five per cent of the charge distilled off and carried with it all of the recovered terpineol. The terpineol recovered from this waste water amounted to 171 parts (92.5% of the theoretical yield) and had a refractive index at 20° C. of 1.4791.

Example IX

Waste water from the stills, having a pH of 3.8 due to dissolved carbon dioxide, was charged to an autoclave and heated to 160° C. under 75 pounds gauge pressure. As soon as this temperature had been reached, the heating was discontinued and the batch allowed to distill. A total of 2.25 parts of oil was recovered from 1125 parts of this waste water. On analysis the oil was found to have a refractive index at 20° C. of 1.4805, a specific gravity at 15.5° C. of 0.9304, and contained 85.6% tertiary alcohols.

Example X

A crude hydrated turpentine (synthetic pine oil from the acetone hydration process) was found to contain 2.48% terpin hydrate. Fifteen hundred parts of this crude hydrated turpentine and 500 parts of distilled water, which had a pH of 6.0, due to dissolved carbon dioxide, were charged into an autoclave and heated to 163° C. for 15 minutes at 100 pounds gauge pressure. The autoclave was then allowed to cool and the oil was separated and dried. Analysis of the oil showed that it contained no terpin hydrate, indicating that the terpin hydrate had been entirely converted to terpineol. The refractive index at 20% C. of the oil before treatment was 1.4772 and after treatment was 1.4775, thus showing that no breakdown of the pine oil to terpene hydrocarbons had occurred.

The dehydration treatment when carried out in accordance with this invention converts terpin hydrate into terpineol without the formation of any appreciable amounts of terpene hydrocarbons. The terpineol formed is a mixture of terpineols in which alpha-terpineol usually predominates. Any source of terpin hydrate may be used to prepare terpineol in accordance with this invention. The process is particularly advantageous in providing a method of recovering terpin hydrate present in waste water, etc., thus resulting in more economical plant operations. It is also of importance in converting the small amounts of terpin hydrate in synthetic pine oil to terpineol without increasing the terpene hydrocarbon content of the pine oil as do the prior art dehydrating agents.

The dehydration reaction may be carried out at a temperature of about 117° C. to about 200° C. at a pressure of from about 40 pounds per square inch to 200 pounds per square inch. The optimum conditions for the reaction are a temperature of 160° C. to 190° C. at a pressure of 75 to 170 pounds per square inch. When operating at the higher temperatures and pressures it is usually desirable to shorten the period of heating, since continued heating at the higher temperatures is apt to cause further dehydration of the terpineol to the undesirable terpene hydrocarbons. However, at lower temperatures and pressures, a longer heating period is required to convert all of the terpin hydrate into terpineol as may be seen from the foregoing examples. For example, while from 2 to 3 hours may be required at lower temperatures, a few seconds is all that is necessary at the higher temperatures.

The process in accordance with this invention may be carried out as a batch or continuous process. Thus, if crystals of terpin hydrate are to be converted, the batch process is probably preferable. However, in the treatment of waste water, or other aqueous solutions of terpin hydrate, the process is of particular value since it may be carried out as a continuous process. For example, the water may be pumped through a coil or vessel under pressure and heated to temperatures of 180°–200° C. and then immediately discharged through a valve to atmospheric pressure or a portion of the water may be distilled off continuously by bleeding through a suitable vapor line and condenser. The steam which flashes off when the water is discharged carries the terpineol, which may then be recovered by condensing and separating it from the water. A continuous process may also be employed for the treatment of synthetic pine oil to convert the small percentage of terpin hydrate in the pine oil to terpineol.

The concentration of terpin hydrate in the reaction mixture may vary over a wide range. Solutions containing as low as 0.2% or less of terpin hydrate have been used successfully in the process, as have saturated solutions. In fact, undissolved terpin hydrate may be present, in which case, as the terpin hydrate in solution is dehydrated, more terpin hydrate dissolves.

The dehydration treatment in accordance with this invention is carried out by utilizing carbon dioxide as the acidifying reagent. The pH of the carbon dioxide solution, i. e. the solution of carbonic acid, may vary from 3.4 to 6.9 and preferably from about 4.0 to about 6.8. At a pH of 7.0, i. e. a neutral solution, no conversion takes place, but with the introduction of only a small amount of carbon dioxide, even to a pH of 6.9, conversion readily takes place. The carbonic acid solution may be formed by simply bubbling carbon dioxide through water until the desired pH is attained. In normal plant operations, the still waste water contains a sufficient amount of dissolved carbon dioxide to carry out the reaction. Usually such water, containing low percentages of terpin hydrate, has a pH of 5.0 to 6.0 due to dissolved carbon dioxide.

As pointed out above, the use of carbon dioxide as the acidifying agent and a pH of 3.4 to 6.9 makes it possible to dehydrate terpin hydrate to terpineol without the further dehydration to terpene hydrocarbons. It also provides a method of converting terpin hydrate to terpineol, from solutions where the terpin hydrate has otherwise not been recoverable. Thus, the process of this invention has made possible economies in operation not formerly realized and also has provided a simple operation of converting terpin hydrate to terpineol without the formation of any appreciable quantities of the undesirable monocyclic terpene hydrocarbons which are normally obtained in the dehydration of terpin to terpineol.

What I claim and desire to protect by Letters Patent is:

1. The process of preparing terpineol from terpin hydrate which comprises heating terpin hydrate with a solution of carbon dioxide, having a pH of about 3.4 to about 6.9, to a temperature of about 117° C. to about 200° C. at a pressure of about 40 to about 200 pounds per square inch, until conversion is substantially complete, and recovering the terpineol from the mixture.

2. The process of preparing terpineol from terpin hydrate which comprises heating terpin hydrate with a solution of carbon dioxide, having a pH of about 4.0 to about 6.8, to a temperature of about 160° C. to about 190° C. at a pressure of about 75 to about 170 pounds per square inch, until conversion is substantially complete, and recovering the terpineol from the mixture.

3. The process of converting the terpin hydrate present in waste water to terpineol, which comprises heating said waste water, containing dissolved carbon dioxide, to a temperature of about 160° C. to about 190° C. at a pressure of about 75 to about 170 pounds per square inch, distilling off and condensing the vapors, and separating the condensed terpineol from the water.

4. The process of converting the terpin hydrate present in synthetic pine oil, which comprises heating said pine oil with a solution of carbon dioxide, having a pH of 3.4 to 6.9, to a temperature of about 160° C. to about 190° C. at a pressure of about 75 to about 170 pounds per square inch.

SERENO G. NORTON.

REFERENCES CITED

The following references are of record in the file of this patent:

UNITED STATES PATENTS

| Number | Name | Date |
|---|---|---|
| 1,408,462 | Marchand | Mar. 7, 1922 |
| 2,336,575 | Sheffield | Dec. 14, 1943 |

OTHER REFERENCES

Bhushan et al.: "Indian Turpentine——." C. A. 39 (1945) col. 4065–4066 (1 page).